(12) United States Patent
Potter et al.

(10) Patent No.: US 9,219,631 B2
(45) Date of Patent: Dec. 22, 2015

(54) SYSTEM AND METHOD FOR INCREASING SPOT BEAM SATELLITE BANDWIDTH

(71) Applicant: Kratos Integral Holdings, LLC, San Diego, CA (US)

(72) Inventors: Robert Potter, Los Altos, CA (US); Stuart Daughtridge, Huntingtown, MD (US); Timothy James Orndorff, Leesburg, VA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 0 days.

(21) Appl. No.: 14/602,073

(22) Filed: Jan. 21, 2015

(65) Prior Publication Data

US 2015/0131761 A1    May 14, 2015

Related U.S. Application Data

(63) Continuation-in-part of application No. 13/843,393, filed on Mar. 15, 2013.

(60) Provisional application No. 61/930,802, filed on Jan. 23, 2014, provisional application No. 61/704,313, filed on Sep. 21, 2012.

(51) Int. Cl.
*H04L 27/26* (2006.01)
*H04B 1/12* (2006.01)
(Continued)

(52) U.S. Cl.
CPC .......... *H04L 27/2653* (2013.01); *H04B 1/0475* (2013.01); *H04B 1/1036* (2013.01); *H04B 1/12* (2013.01); *H04B 1/123* (2013.01); *H04L 27/0012* (2013.01)

(58) Field of Classification Search
CPC .. H04L 27/2653; H04L 27/0012; H04B 1/12; H04B 1/0475; H04B 1/1036; H04B 1/123
See application file for complete search history.

(56) References Cited

U.S. PATENT DOCUMENTS 6,430,391 B1 *  8/2002  Dent et al. ................... 455/11.1
7,031,370 B1    4/2006  Fukumasa
(Continued)

FOREIGN PATENT DOCUMENTS

WO    0163777 A1      8/2001
WO    2008053414 A1   5/2008
WO    2008053141 A8   4/2009

OTHER PUBLICATIONS

A World Leader in Satellite Interference Detection and Carrier Monitoring Systems, SAT Corporation, SatMagazine, May 2008.
(Continued)

*Primary Examiner* — Leon Flores
(74) *Attorney, Agent, or Firm* — Procopio, Cory, Hargreaves & S

(57) ABSTRACT

A device and method for demodulation of multiple received signals is provided. The device can have a receiver configured to receive a composite signal having two or more constituent signals overlapped in frequency. The device can have one or more processors configured to determine a at least one modulation type and at least one symbol rate corresponding to the two or more constituent signals. The one or more processors can further resample the composite signal at a sampling rate that is a multiple of the at least one symbol rate to determine the characteristics of the two or more constituent signals. The one or more processors can separate and output the two or more constituent signals using the determined characteristics.

20 Claims, 7 Drawing Sheets

(51) Int. Cl.
*H04B 1/04* (2006.01)
*H04B 1/10* (2006.01)
*H04L 27/00* (2006.01)

(56) References Cited

U.S. PATENT DOCUMENTS

| | | |
|---|---|---|
| 7,639,761 B2 | 12/2009 | Chu et al. |
| 8,433,015 B2 | 4/2013 | Downey et al. |
| 2005/0111347 A1* | 5/2005 | Breiling et al. ............... 370/206 |
| 2006/0067446 A1 | 3/2006 | Maeda et al. |
| 2006/0121946 A1 | 6/2006 | Walton et al. |
| 2006/0182203 A1* | 8/2006 | Miller ........................... 375/340 |
| 2009/0122928 A1 | 5/2009 | Twitto |
| 2009/0175465 A1 | 7/2009 | Kwon et al. |
| 2011/0135043 A1 | 6/2011 | Downey et al. |
| 2011/0268168 A1* | 11/2011 | Dybdal et al. ................ 375/225 |
| 2012/0076220 A1 | 3/2012 | Kimura et al. |
| 2012/0214524 A1* | 8/2012 | Wajcer et al. ................. 455/502 |
| 2013/0294494 A1 | 11/2013 | Wang |

OTHER PUBLICATIONS

Digital Spectrum Analysis for Interference Detection and Analysis, SAT Corporation, Aug. 2005.
Bob Potter, Reducing Interference in Satellite Communication, SAT Corporation, Jul. 2006.
International Search Report and Written Opinion for related PCT application No. PCT/US2013/060980, mailed on Feb. 7, 2014, in 10 pages.

* cited by examiner

SYSTEM AND METHOD FOR INCREASING SPOT BEAM SATELLITE BANDWIDTH

INCORPORATION BY REFERENCE TO ANY PRIORITY APPLICATIONS

This application claims the benefit of priority to U.S. Provisional Application 61/930,802, entitled, INTERFERENCE MITIGATION TECHNIQUES TO INCREASE THROUGHPUT OF SPOT BEAM SATELLITES, filed Jan. 23, 2014, and is a continuation-in-part of U.S. Utility application Ser. No. 13/843,393, entitled ENVELOPE FEEDBACK INTERFERENCE REDUCTION AND DATA THROUGHPUT MAXIMIZATION, filed Mar. 15, 2013, which is a nonprovisional of U.S. Provisional Application 61/704,313, entitled ENVELOPE FEEDBACK INTERFERENCE REDUCTION AND DATA THROUGHPUT MAXIMIZATION, filed Sep. 21, 2012, which applications are hereby incorporated by reference in their entirety.

BACKGROUND

1. Technological Field

This disclosure generally relates to interference reduction and signal demodulation, and more specifically, to interference reduction and throughput maximization associated with signal separation in satellite communications.

2. Background

The bandwidth available for high speed wireless communications is finite while use of various frequency spectra within that available bandwidth is ever-increasing. Use and reuse of the available frequencies and frequency spectra can lead to increased interference among transmissions and an increased need to make as efficient use of the available bandwidth as possible.

One way by which interference can be reduced is to put as much separation as possible between potentially interfering signals. Such separation may be, for example, by separating the signals in frequency, by physical distance, in time, or the like. Such separation may also reduce or otherwise limit the amount of information that can be transmitted between a transmitter and a receiver. Such separation techniques can diminish the efficiency with which information can be transmitted over the communication system.

SUMMARY

One aspect of the disclosure provides an apparatus for demodulation of multiple received signals. The apparatus can have a receiver configured to receive a composite signal. The composite signal can have a first signal and a second signal. The first signal can overlap the second signal. The apparatus can also have at least one processor configured to exponentiate the composite signal n-times until a first power of n yields a first continuous wave corresponding to the first signal and a second power of n yields a second continuous wave corresponding to the second signal. A power index-n can correspond to a modulation estimate for each of the first signal and the second signal. The processor can also derive at least one symbol rate corresponding to the first signal based on the first power of n and the second power of n. The processor can also resample the composite signal based on the modulation estimate at x-times the at least one symbol rate to determine a symbol trajectory and modulation type for the first and second signals, and offset information between the first signal and the second signal. The processor can also regenerate the first signal and the second signal based on the at least one modulation type, the at least one symbol trajectory, and offset information. The processor can also output the first signal and the second signal.

Another aspect of the disclosure provides a method for demodulating multiple signals. The method includes receiving a composite signal. The composite signal can have a first signal and a second signal, the first signal overlapping the second signal. The method also includes exponentiating the composite signal n-times until a first power of n yields a first continuous wave corresponding to the first signal and a second power of n yields a second continuous wave corresponding to the second signal. A power index-n can correspond to a modulation estimate for each of the first signal and the second signal. The method also includes deriving a symbol rate of the composite signal corresponding to at least one of the first signal and the second signal. The method also includes resampling the composite signal based on the modulation estimate at x-times the symbol rate estimate to determine a symbol trajectory and a modulation type of each of the first signal and the second signal and offset information between the first signal and the second signal. The method also includes regenerating the first signal and the second signal based on the modulation type, the symbol trajectory, the shaping factor, and the offset information. The method also include outputting the first signal and the second signal.

Another aspect of the disclosure provides a method for demodulating a composite signal. The composite signal can have a first constituent signal overlapping a second constituent signal in frequency. The method can include multiplying the composite signal by itself a first number of times until the first number of times produces at least one continuous waveform, the first number of times indicating at least one modulation estimate. The method can also include determining at least one symbol rate of the composite signal. The at least one symbol rate can be based on the first number of times and the continuous waveform. The method can also include resampling the composite signal based on the at least one modulation estimate at a multiple of the at least one symbol rate to determine a symbol trajectory, a modulation type, and offset information between the first constituent signal and the second constituent signal. The method can also include regenerating the first constituent signal and the second constituent signal based on the modulation type, the symbol trajectory, the shaping factor, and the offest information. The method can also include outputting the first constituent signal and the second constituent signal.

Other features and advantages of the present invention should be apparent from the following description which illustrates, by way of example, aspects of the invention, wherein like numbers refer to like features throughout.

DESCRIPTION OF THE DRAWINGS

The details of embodiments of the present invention, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the invention may be practiced. The detailed description includes specific details for the purpose of providing a thorough understanding of the embodiments. In some instances, well-known structures and components are shown in simplified form for brevity of description.

Separating signals in frequency or physical distance to minimize or reduce interference may decrease the amount of information that can be transmitted via a given communication channel or medium. If an interfering signal is received from an unknown or hostile source, separating signals in these ways may not be possible as little or no information about the interfering signal may be available.

As noted above, separating signals in frequency or physical distance to reduce interference can decrease the amount and rate at which information can be transmitted between a transmitter and a receiver. Further, if the interfering signal is from an unknown (as is typically the case) or hostile source, separating signals in these ways may not be possible. Thus, reuse of bandwidth over multiple signals or overlapping transmitted signals in frequency may provide efficient use of available frequency spectra.

In some embodiments disclosed herein, certain demodulation techniques may have applications in multiple different communications systems including, but not limited to: satellite communications signals and satellite command and control (C2) links; unmanned aerial vehicle (UAV) line of sight (LOS) and satellite data links; shipboard microwave and satellite communications systems; microwave communications links; GPS receivers; cellular phone communications links; cable signals; and any point-to-point or point-to-multi-point radio frequency (RF) systems that are susceptible to accidental or intentional interference. It also can be used to allow blind dual-carrier signal processing that provide increased capacity for significantly higher data rates over a satellite transponder or other fixed RF bandwidth link than single carrier transmission.

Figure 1:
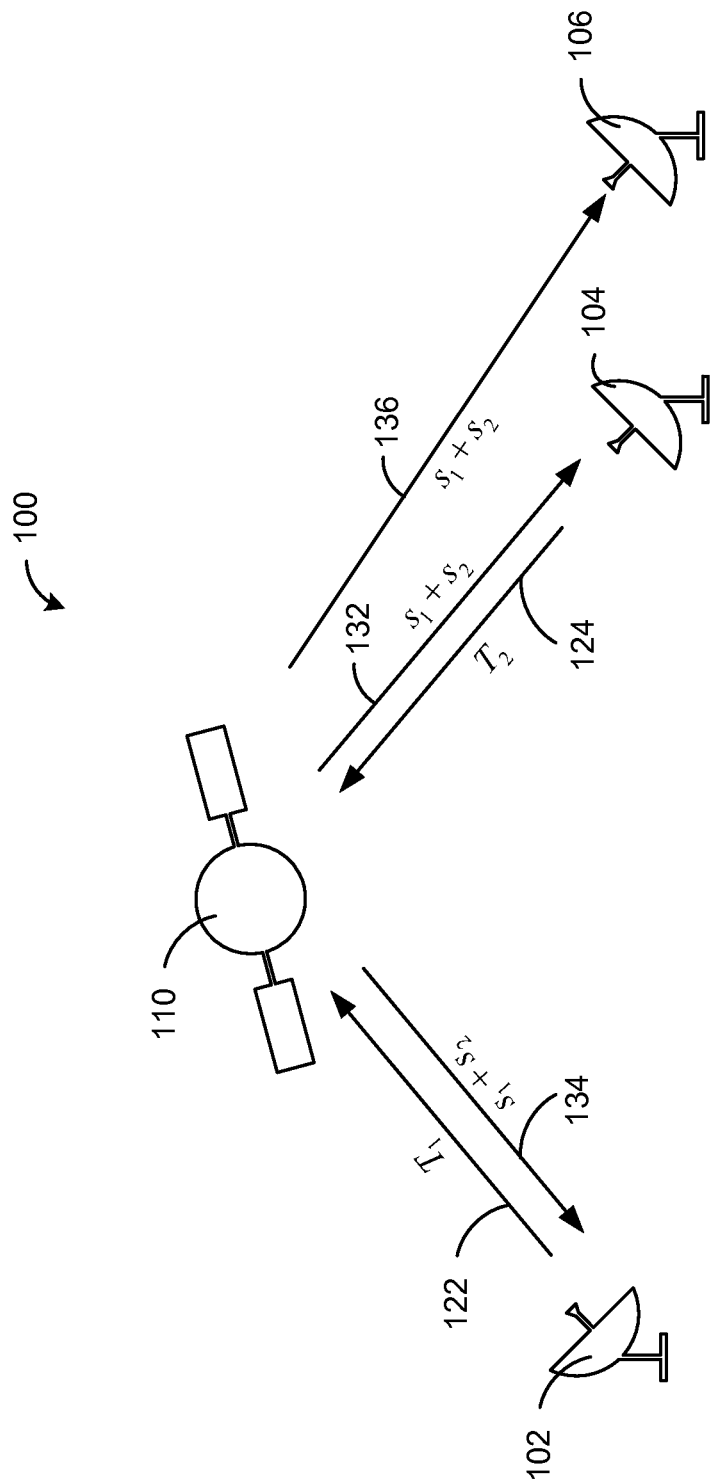
FIG. 1 is graphical depiction of an embodiment of satellite communications between a plurality of ground stations.

FIG. 1 is graphical depiction of an embodiment of satellite communications between a plurality of ground stations. A communication system ("system") 100 depicts a plurality of ground stations 102, 104, 106 communicating with one another via a satellite 110. In some embodiments, the communication system 100 may comprise more than three ground stations 102, 104, 106 and more than one satellite 110.

Some systems may depend upon local copies of the outgoing signals for echo cancellation for interference reduction. In some systems a balanced approach to point-to-point or point-to-multipoint satellite communications may require certain signal processing at both ends of a communications link (e.g., a transmitter-receiver pair). In other systems another, an unbalanced approach may require signal processing only at one site. The communication system 100 of FIG. 1 is an example of an unbalanced approach in which the ground station 106 does not have a local copy of transmitted signals, as described below.

The ground station 102 may transmit a signal 122 ($T_1$) to the satellite 110 that is then relayed to the ground stations 104, 106. The ground station 104 may transmit a signal 124 ($T_2$) to the satellite 110 that is relayed to the ground station 102 and the ground station 106. The ground station 102 may receive the signal 124 ($T_2$) and an echo of its own transmitted signal 122 ($T_1$) as a composite signal 134 (shown as, $S_1+S_2$). Similarly, the ground station 104 may receive the signal 122 ($T_1$) and an echo of its own transmitted signal 124 ($T_2$) as a composite signal 132 (shown as, $S_1+S_2$). As used in FIG. 1, the "T" indicates a transmitted signal while the "S" indicates a corresponding signal received at one or more of the ground stations 102, 104, 106. The "$S_1$" and "$S_2$" may also refer to constituent signals of a composite signal (e.g., the composite signals 132, 134, 136).

In some embodiments, both of the ground stations 102, 104 may have a local copy of the transmitted signals 122, 124 to use in echo cancellation. In some cases, the removal of the self-interfering transmitted signal is accomplished using a process such as echo cancellation. In such an embodiment, the "echo" may be provided by sampling the transmit signal 122, 124, processing this signal through a delay line (not shown), matching phase and gain of the incoming composite signal 132, 134 and cancelling the transmitted signal within the downlink signal to extract the additional signal within the processed frequency space. The echo cancellation may provide certain levels of interference reduction within the communication system 100 such that they may be able to receive and successfully demodulate the signal 122 and the signal 124 respectively.

The ground station 106 on the other hand does not transmit a signal of its own and thus may not have any significant echo cancellation capabilities for reception and processing of the signal 122 ($S_1$) and the signal 124 ($S_2$). The signal 122 ($S_1$) and the signal 124 ($S_2$) together, as received by the ground station 106, is designated composite signal 136. The composite signal 136 may be similar to the composite signal 132 and the composite signal 134, being a combination of two signals, $S_1+S_2$. In some embodiments, either or both of the signal 122 and the signal 124 can be signals of interest for the ground station 106.

The composite signal 136 may however be subject to different forms and levels of interference due to different operating environments. In some embodiments the composite signals 132, 134, 136 may further include varying amounts of interference in addition to echo interference. In other embodiments, the one or more signals 122, 124 found within the composite signals 132, 134, 136 may also be referred to herein as constituent signals. Two modulated signals transmitted together may also be considered an additional modulation. Thus, for example, the signal 122 and the signal 124 may be referred to as constituent signals of the composite signal 136.

In some embodiments, a signal of interest (e.g., the signal 122 or the signal 124) can be characterized can be canceled from the composite signal 136, for example, leaving a noise floor. The noise floor as used herein may generally refer to the measure of the signal created or regenerated from the sum of all the noise sources and unwanted signals within a measurement system, where noise is defined as any signal other than the one being monitored. The noise floor can describe a residual signal or remaining noise after the signal of interest (e.g., the signal 122, 124) is removed from the composite signal 136. The noise floor can then be characterized using the interference mitigation or the interference removal methods described herein (described below in connection with FIG. 4 and FIG. 5) to create a canceling signal.

In some embodiments, the noise floor may not be characterized. Accordingly, the canceling signal that has been created can be combined in a feed-forward loop with a copy of the composite signal, while compensating for frequency and amplitude variations, to reduce the noise floor. This may result in a higher signal-to-noise (SNR) ratio for the signal of interest. This can increase the potential data throughput of the signal by allowing the use of higher-order modulation schemes, and thus increase the throughput of the entire satellite 110.

In some embodiments, in order to maximize the use of the available frequency spectra, the signal 122 and the signal 124 may use the same or similar bandwidth. In some embodiments, the signal 122 and the signal 124 may have the same amplitude. In some other embodiments, the signal 122 and the signal 124 may differ slightly in one or more of bandwidth, phase, and amplitude. Accordingly, the ground stations 102, 104 may accidentally or intentionally utilize similar frequencies, bandwidths, and power levels (e.g., amplitude) to transmit their respective signals ($T_1$, $T_2$) for example, the signal 122 and the signal 124. Thus, the ground station 106 may receive the signal 122 and the signal 124 having a significant or complete frequency overlap between the received signals. In some embodiments, there may be more than two overlapped signals, as described below in connection with FIG. 5. The overlap of two or more signals of interest may present the ground station 106 with certain problems requiring separation and parsing of overlapped and possibly interfering signals, for example the signal 122, and the signal 124.

Modulation as described herein may include, but not be limited to analog or digital modulation. Some of the modulation schemes referenced herein can include but not be limited to quadrature amplitude modulation (QAM), phase shift keying (PSK), binary PSK (BPSK), quadrature PSK (QPSK), differential PSK (DPSK), differential QPSK (DQPSK), amplitude and phase shift keying (APSK), offset QPSK (OQPSK), amplitude shift keying (ASK), minimum-shift keying (MSK), Gaussian MSK (GMSK) among other types of modulation, time division multiple access (TDMA), code division multiple access (CDMA), orthogonal frequency division multiple access (OFDMA), and continuous phase modulation (CPM). Certain modulation types such as for example QAM and APSK may also differ in modulus, for example, 4QAM, 8QAM, and 16APSK, to name a few.

Figure 2:
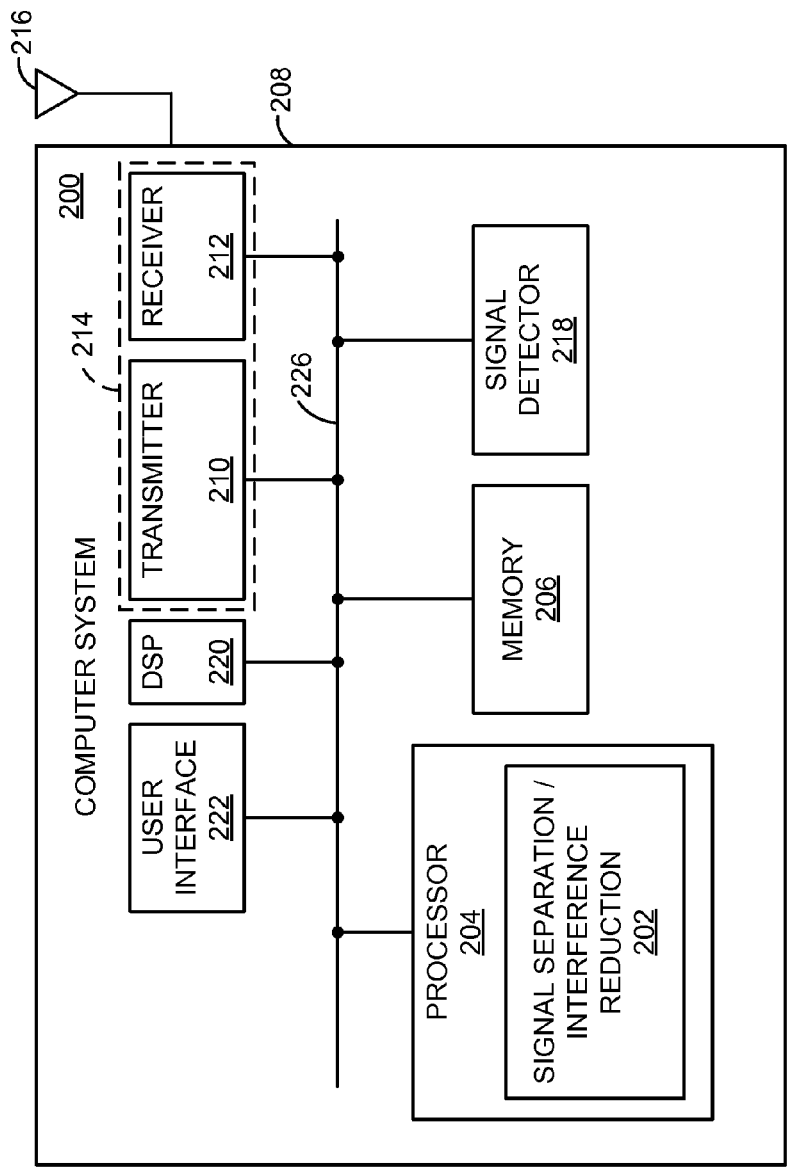
FIG. 2 is a functional block diagram of components of a communication device that may be employed within the communication system of FIG. 1.

FIG. 2 is a functional block diagram of components of a communication device that may be employed within the communication system of FIG. 1. As shown, communication device 200 may be implemented as the ground stations of FIG. 1. For example the communication device 200 may comprise the ground station 106.

The communication device ("device") 200 may include a processor 204 which controls operation of the communication device 200. The processor 204 may also be referred to as a central processing unit (CPU). The communication device 200 may further include a memory 206 operably connected to the processor 204, which may include both read-only memory (ROM) and random access memory (RAM), providing instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the communication device 200 is implemented or used as a receiving node or ground station, the processor 204 may be configured to process information from of a plurality of different signal types. In such an embodiment, the communication device 200 may be implemented as the ground station 106 and configured to receive and parse or separate the composite signal 136 into its constituent signals (e.g., the signal 122 and the signal 124). For example, the processor 204 may be configured to determine the frequency, bandwidth, modulation type, shaping factor, and symbol trajectory, among other transmission characteristics in order to recreate or regenerate the signals 122, 124. The processor 204 may implement various processes or methods in certain signal separation and interference reduction modules ("modules") 202 to effect such determinations. The modules 202 may also include the adaptive regenerative technology (ART) described in connection with FIG. 3, below.

The processor 204 may further include one or more adaptive equalizers (not shown). The adaptive equalizers may be configured to estimate and characterize incoming signals in the time domain.

The processor 204 may comprise or be a component of a processing system implemented with one or more processors 204. The one or more processors 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 204 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 204, cause the processing system to perform the various functions described herein.

The communication device 200 may also include a housing 208 that may include a transmitter 210 and a receiver 212 to allow transmission and reception of data between the communication device 200 and a remote location. For example, such communications may occur between the ground stations 102, 104, 106. The transmitter 210 and receiver 212 may be combined into a transceiver 214. An antenna 216 may be attached to the housing 208 and electrically coupled to the transceiver 214, or to the transmitter 210 and the receiver 212 independently. The communication device 200 may also include (not shown) multiple transmitters, multiple receivers, multiple transceivers, and/or multiple antennas.

The communication device 200 may also include a signal detector 218 that may be used in an effort to detect and quantify the level of signals received by the transceiver 214. The signal detector 218 may detect such signals as frequency, bandwidth, symbol rate, total energy, energy per symbol, power spectral density and other signal characteristics. The signal detector 218 may also be include a "windowing module," (described in FIG. 3) and may further be configured to process and incoming data (e.g., one or more signals 122, 124) ensuring that the processor 204 is receiving a correct bandwidth-limited portion of a wireless communication spectrum in use. As a non-limiting example, certain transmissions to and from a ground station 102, 104 can incur certain time and frequency variations by the time the transmissions are received at the satellite 110 and rerouted to the ground station 106. Such variations may be due to Doppler shift and distance traveled, among other factors. Accordingly, the signal detector 218 (or windowing module) may correct the incoming signal(s) 136 for bandwidth and center frequency to ensure the processor 204 received the correct portion of the spectrum including the signal(s) 122, 124, 136.

The communication device 200 may also include a digital signal processor (DSP) 220 for use in processing signals. The DSP 220 may be configured to generate a data unit for transmission. The DSP 220 may further cooperate with the signal detector 218 and the processor 204 to determine certain characteristics of the composite signal 136.

The communication device 200 may further comprise a user interface 222 in some aspects. The user interface 222 may comprise a keypad, a microphone, a speaker, and/or a display. The user interface 222 may include any element or component that conveys information to a user of the communication device 200 and/or receives input from the user.

The various components of the communication device 200 described herein may be coupled together by a bus system 226. The bus system 226 may include a data bus, for example, as well as a power bus, a control signal bus, and a status signal bus in addition to the data bus. Those of skill in the art will appreciate the components of the communication device 200 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

Figure 3:
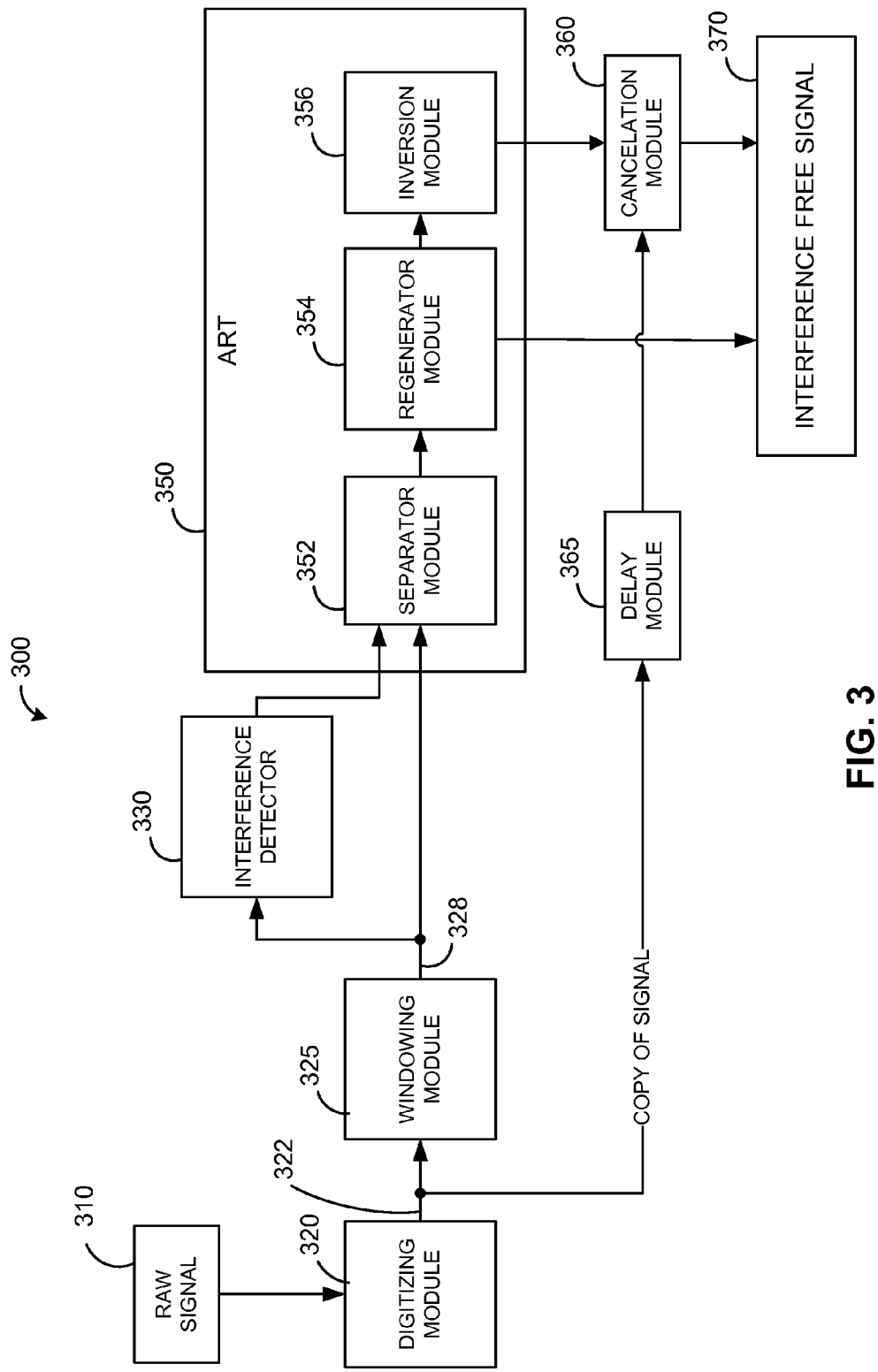
FIG. 3 is a functional block diagram of a signal demodulator.

FIG. 3 is a functional block diagram of a signal demodulator ("demodulator"). A demodulator 300 can receive a raw signal 310 a portion of which can include one or more signals of interest. For example, the ground station 106 may receive the raw signal 310 including the composite signal 136, which, as noted above, can have multiple constituent signals 122, 124. The raw signal 310 may comprise an entire spectrum or spectra of frequencies in use for wireless communications (e.g., satellite communications).

The raw signal 310 is received by the receiver 212 (FIG. 2) and processed by a digitizing module 320. The digitizing module 320 can comprise one or more analog to digital (A2D) converters for translating the raw signal 310 from an analog signal to a digital signal. The digitizing module 320 can output a digitized signal 322.

The demodulator 300 can further have a windowing module 325 operably coupled to the digitizing module 320. As noted above, the windowing module 325 can be a component of the signal detector 218. The windowing module 325 can also cooperate with the processor 204 and the DSP 220 to complete the processes described herein.

In some embodiments, the windowing module 325 can be configured to limit the bandwidth of the digitized signal 322 or focus on a portion of the digitized signal 322 to ensure the demodulator 300 processes the desired portion of the spectrum encompassing the signal(s) of interest. In some embodiments, the desired portion of the spectrum may contain the one or more signals of interest (e.g., the signal 122 and the signal 124). The windowing module 325 can also correct the bandwidth-limited portion of the spectrum for center frequency and bandwidth such that the signal(s) of interest (e.g., the composite signal 136 and the signals 122, 124) are processed by the demodulator 300. For purposes of the following description, the bandwidth limited portion of the digitized signal 322 limited by the windowing module 325 may generally be referred to herein as a windowed signal 328. In some embodiments, the windowed signal 328 may be a digital form of the composite signal 136 containing multiple constituent signals (e.g., the signal 122 and the signal 124). One or more of the constituent signals can be the signal(s) of interest.

The demodulator 300 can further include an interference detector 330. In some embodiments, the interference detector 330 can be configured to receive the windowed signal 328 and determine the presence of the signal 122 and the signal 124, or the composite signal 136, in addition to other interfering signals. In some embodiments, two or more signals that are themselves individually modulated (e.g., QPSK, 4QAM, 16APSK, etc.) may further be considered a modulation when propagated together as the composite signal 136.

The interference detector 330 can process incoming windowed signal 325 in the time domain to determine the presence of multiple interfering signals (e.g., the signal 122 and the signal 124). The interference detector 330 can also process the windowed signal 328 in the frequency domain. In some embodiments, the interference detector 330 can analyze the Fourier transform of the modulus of the windowed signal 328 to determine the presence of multiple constituent signals. In some other embodiments, the processes conducted by the interference detector 330 can be implemented in software.

The interference detector 330 may use processes in both frequency and time to determine at least a modulation estimate and a symbol rate or clock rate. In some embodiments, the modulation estimate may be derived by multiplying the windowed signal 328 by itself n-times until a continuous wave (CW) is the product of the windowed signal 328 raised to a power of n. As used herein, the operation of multiplying a signal by itself, or raising a signal to a power of n is generally referred to as "exponentiation." Exponentiation of the windowed signal 328 can be completed multiple times to determine the presence of multiple constituent signals in the time domain and the frequency domain. Accordingly, the windowed signal 328 may be multiplied by itself until the interference detector 330 (or signal detector 218) determines there are one, two, or more signals present in the windowed signal 328. Each of the constituent signals (e.g., the signal 122 and the signal 124) may have a different modulation and thus produce a CW product at different powers of n. For example, exponentiation of a composite signal 136 having three constituent signals with three different modulation types can produce three separate CW waveforms at three different powers of n. In another example, two or more of the constituent signals can have the same modulation and thus the CW waveforms would result at the same value of n. In some embodiments, the power of n is a multiple of two.

The interference detector 330 can further derive a symbol rate estimate through the exponentiation function of the windowed signal 328. The exponentiation of the windowed signal 328 may result in an indication or an estimate of an associated symbol rate. In some embodiments, when the signal is multiplied by itself a number of times, the phase of the symbols may correlate or cancel, resulting in a CW product indicated by a single frequency in the frequency domain. This process may also yield small side lobes, (e.g., "side spurs") that are evenly spaced about the CW frequency. The spacing of the side lobes are related to the symbol rate for the carrier of the corresponding constituent signal and may be used to estimate the symbol rate. The interference detector 330 can further have one or more adaptive equalizers (not shown) configured to use the exponentiation product(s) and the spacing of the "side spurs" to further refine the one or more symbol rate estimates to derive one or more actual symbol rates corresponding to the constituent signals. In some embodiments, such adaptive equalizers can run at a multiple of the symbol rate estimates to derive actual symbol rates. In some embodiments, this process may be completed for each distinct value of n (e.g., power of n). The one or more actual symbol rates can correspond to the one or more constituent signals present in the windowed signal 328. For example, if the composite signal has three exemplary constituent signals with three different symbol rates (as above), three separate symbol rates can be derived by the interference detector 330. In an embodiment, two or more constituent signals may be present having the same symbol rate. In another embodiment, the two or more constituent signals (e.g. the signal 122 and the signal 124) can have the same symbol rates but different modulation.

The demodulator 300 can further include one or more adaptive regenerators ("ART") 350. The acronym "ART" as used herein stands for Adaptive Regenerative Technology" and can generally refer to the processors comprising the ART 350. The ART 350 of FIG. 3 may have multiple subcomponents or modules. When one or more signals (e.g., signals of interest and interfering signals) are detected by the interference detector 330, the windowed signal 328 may pass to a separator module 352 within the ART 350.

The separator module 352 may resample the windowed signal 328 using the modulation estimate (from the interference detector 330) at X-times the symbol rate. In some embodiments, the windowed signal 328 can be resampled at X-times the symbol rate for each symbol rate detected by the interference detector 330, similar to the interference detector 330. Thus the separator module 352 can sample the incoming constituent signal(s) at a high rate and derive a symbol trajectory, shaping factor, and a more accurate estimate of the modulation type of each of the constituent signals present in the windowed signal 328. The separator module 352 can also determine the constituent signals' frequency and bandwidth, and a phase offset between each of the constituent signals (e.g., the signals 122, 124) within the windowed signal 328. As used herein, shaping factor may generally refer to concentration or distribution of signal energy of a given constituent signal (e.g., the signal 122 or the signal 124). In some embodiments, the shaping factor may be a root-raised cosine spectra of the windowed signal 328. Shaping factor may be used when referring to the frequency domain of the windowed signal 328 while "pulse shaping" may be used to refer to the time domain of the windowed signal 328.

The ART 350 can further have a regenerator module 354 operably coupled to the separator module 352. The regenerator module 354 can use the symbol trajectory, coupled with the shaping factor, modulation, and phase offset of the constituent signals to regenerate each of the constituent signals (e.g., the signals 122, 124). The regenerator module 354 may further use the bandwidth, frequency offset, and amplitude in the regeneration of the constituent signals. In some embodiments the demodulation of each of the constituent signals (e.g., the signal 122 and the signal 124) may be completed simultaneously or at least concurrently.

In some embodiments, if the regenerator module 354 outputs a regenerated version of the constituent signals (e.g., the signal 122 and the signal 124), the processor 204 may determine which of the constituent signals is/are a desired signal and protect or otherwise isolate and focus on the desired signal (e.g., the signal 122). For example, if the signal 122 and the signal 124 are constituent signals of the windowed signal 328, the processor may select the signal 122 as the desired signal and output an interference free version of the signal 122. In some embodiments, the signal of interest (e.g., the signal 122) can be used to further characterize the noise floor of the composite signal 136. The noise floor can then be canceled to increase the SNR of the signal of interest (e.g., the signal 122).

If the regenerated signal(s) is/are not the signals of interest, they may be used for interference cancellation. The ART 350 can further have an inversion module 356 operably coupled to the regenerator module 354. The inversion module 356 can invert the signal 122 and sum the inverted copy of the signal 122 with a copy of the digitized signal 322 in a cancellation module 360. Due to the processing time, the copy of the digitized signal 322 may be provided through a delay module 365. The cancellation module 360 may correct the inverted copy of the interfering signal for gain and phase with the raw signal 310 to produce an interference free signal 370. In some embodiments, the interference free signal 370 may be processed again to further reduce any interference present. The interference free signal 370 may be considered a copy of the desired signal (e.g., the signal 122) or a copy of the digitized signal 322 with the interfering signal (e.g., the signal 124) canceled.

In some embodiments, the demodulator 300 can further have a digital to analog (D2A) converter (not shown) coupled to the cancellation module 360 and the regenerator module 354 that may convert the processed signals back into an analog signal.

Figure 4:
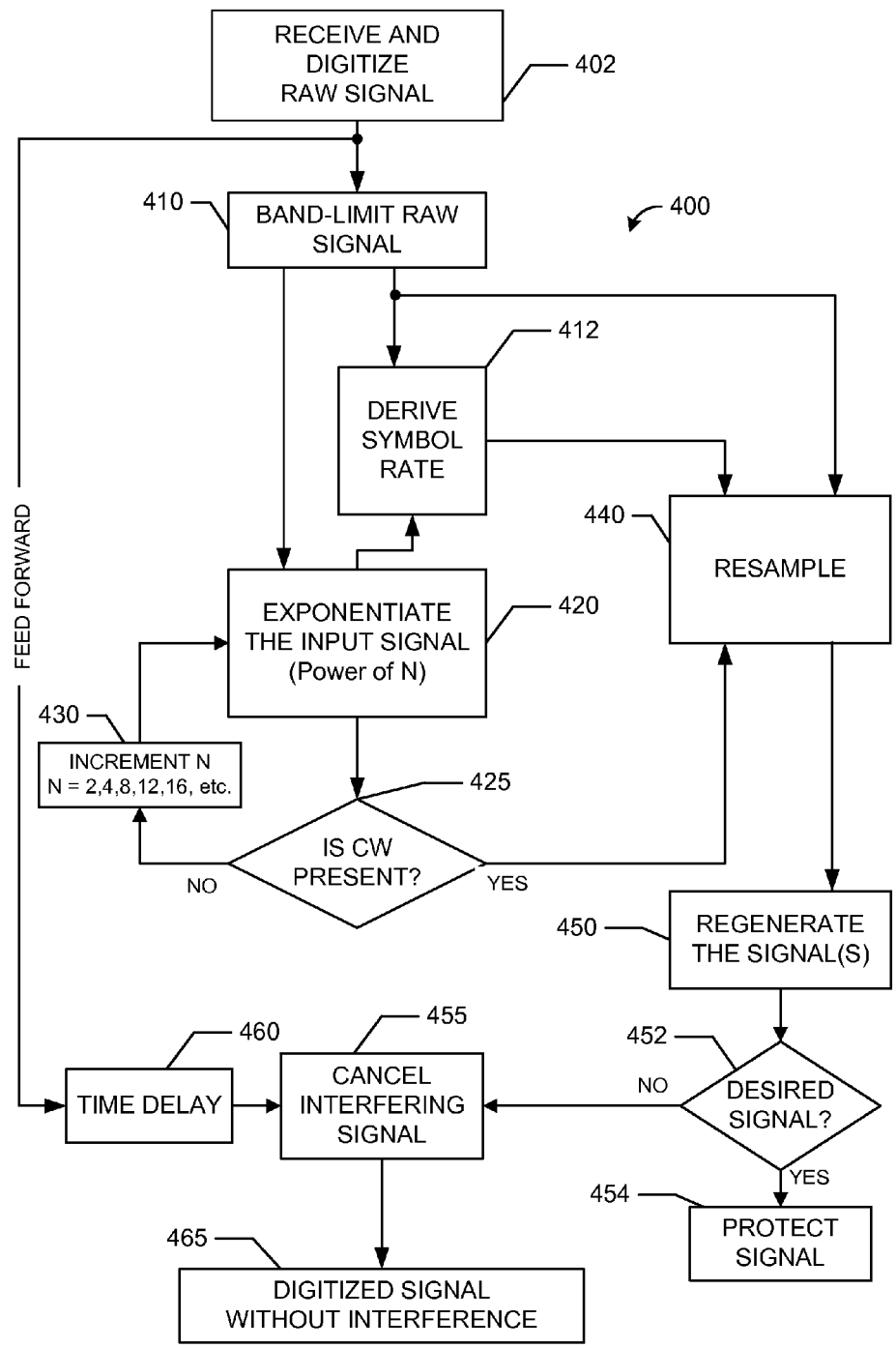
FIG. 4 is a flowchart of a method of signal separation.

FIG. 4 is a flowchart of a method of signal separation. As shown, a method for signal separation ("method") 400 may start at block 402 with receiving the raw signal 310 (see, FIG. 3). The raw signal 310 can also be digitized by the digitizing module 320 at block 402. In some embodiments, the signal(s) of interest (e.g., the signal 122, 124) may only occupy a portion of the raw signal 310 spectrum. Additionally, the demodulation system 300 may selectively limit the amount of raw signal 310 regarded for signal processing. At block 410, the windowing module 325 can adjust the bandwidth that the demodulation system 300 regards as the bandwidth of interest. For example, the raw signal 310 may be a large swath of frequencies containing not only the signal(s) of interest (e.g., the signal 122 and the signal 124) but also various other transmissions not necessarily intended for the ground station 106 or other interfering transmissions. Accordingly, at the block 410, the windowing module 325 may band limit the raw signal 310 (e.g., the windowed signal 328, FIG. 3) to focus on the bandwidth in which the signal 122 is expected to be received. In some embodiments, both the signal 122 and the signal 124 may be signals of interest, thus the windowing module 325 can band limit the raw signal 310 to receive both signals 122, 124. In some other embodiments, the windowed signal 328 can include more than the signals 122, 124. In some embodiments, little or no information may be known at the demodulator 300 about the signal 122, the signal 124, or any other interfering signals that are received. In some cases however, at least an expected bandwidth may be known.

Due to Doppler shift over long transmission distances from the ground station 102 or the ground station 104 to the satellite 110, and then to the ground station 106, certain time delays or shifts in frequency may result. For example, the signal 124 may be expected to have a center frequency of 1.44 MHz (Megahertz) and a bandwidth of 22 MHz. Such a signal (e.g., the signal 124) may be shifted in time and frequency over the long transmission path, and thus arrive at the ground station 106 as a portion of the composite signal 136 having a center frequency of 1.452 MHz and a bandwidth of 22.64 MHz as determined by the windowing module 325. The bandwidth and center frequency of the windowed signal 328 may further depend on other factors determined by, e.g., the processor 204.

Thus in some embodiments, the windowing module 325 may further adjust the bandwidth of the received portion of the spectrum (e.g., the raw signal 310) to focus on the signal 124. In another embodiment, the composite signal 136 may have one or more constituent signals (e.g., the signal 122 and the signal 124). The windowing module 325 may then adjust the bandwidth of the received raw signal 310 to encompass the all of the constituent signals (e.g., the signals 122, 124). As described below in connection with FIG. 6A, FIG. 6B, and FIG. 6C, the composite signal 136 may comprise multiple constituent signals 122, 124 overlapped in frequency.

At block 420 the interference detector 330 may exponentiate the windowed signal 328. The exponentiation process can include raising the windowed signal 328 to a power of n, or multiplying the windowed signal 328 by itself n number of times until a CW is the product of the power of n. In some embodiments, the exponentiation can be completed in the time domain. The interference detector 330 can be configured to perform such an operation in small time blocks in the time domain of the windowed signal 328. In some embodiments, this may be performed by software.

At decision block 425 the interference detector 330 may determine if one or more CWs are produced by the exponentiation. If not, the method 400 may increment n at block 430. The method 400 may then return to block 420 to again exponentiate the windowed signal 328 at n+2, for example. The exponentiation at block 420 may be repeated until one or more CWs are present.

In some embodiments, multiple constituent signals within the composite signal 136 (e.g., the windowed signal 328) may yield more than one CW product at different powers of n. For example, if the signal 122 is modulated using BPSK the continuous wave may result at n=2. As another example, if the signal 124 is modulated using QPSK then the CW waveform would result from a power of n=4. In some embodiments, n is a factor of 2. The power index n then provides an indication of the modulation type: 1=CW; 2=BPSK; 4=QPSK, and on to n=m. In some embodiments m may be any integer multiple of two. Certain additional processes may be required to disambiguate between QPSK and 16QAM, for instance as both may yield a CW at n=4. This is described in more detail below.

In some embodiments, the windowed signal 328 received by the interference detector 330 may be received as a data stream of symbols in I and Q form, where I represents a symbol coordinate on a real axis and Q represents a symbol coordinate on an imaginary axis. The I and Q data may further be implemented to represent polar coordinates of a given symbol. Accordingly, a complex signal can be represented as $S_C = S_i + S_q$. The signal $S_C$ is exponentiated (e.g., raised to a power n) where n can be, for example, a multiple of two: n=2, 4, 8, 12, 16, 24, 32, etc. The value(s) of n can indicated one or more modulation types. The complex components of the signal $S_C$, and $S_q$, can also be exponentiated to determine whether the modulation type has a constant amplitude. For example, at n=4, the modulation can be QPSK or QAM. In order to disambiguate between the two types, the interference detector 330 can build a histogram of symbol vectors representing symbol power and phase to determine whether there are multiple power and phase states within each quadrant of I and Q. The histogram can reveal whether the modulation of $S_C$ is QPSK, 8QAM, 16QAM, or 64QAM. In some embodiments, APSK (e.g., 16-APSK or 32-APSK) may be present. Such signals may be associated with Digital Video Broadcasting—Satellite—Second Generation (DVB-S2). In some other embodiments, the interference detector 330 can further distinguish MSK, GMSK, OQPSK, and 8PSK among other modulation types, such as those listed above in the description of FIG. 1.

At block 412, the interference detector 330 can also derive one or more symbol rates of the one or more constituent signals within the windowed signal 328. As noted above, the interference detector 330 can include one more adaptive equalizers configured to use the exponentiation results to refine one or more symbol rate estimates corresponding to the one or more constituent signals. The adaptive equalizers may be can be run at a multiple of the estimated symbol rate in order to refine the symbol rate estimates into actual symbol rates that can be provided to the ART 350. If at the decision block 425, the interference detector 330 determines the presence of one or more CW products, the method proceeds to block 440. At block 440, the interference detector 330 may provide the one or more symbol rates (from block 412) and a modulation estimate based on the power factor n (from block 420) to the ART 350. The ART 350 may then resample the windowed signal 328 using the power factor n at X-times the symbol rate (from block 412). Accordingly, the ART 350 may resample the windowed signal 328 at a high rate to determine a symbol trajectory and refine the modulation type. In the presence of multiple constituent signals, the ART 350 may further determine phase offset and frequency offset between the individual constituent signals.

At block 450 the ART 350 can regenerate the resampled signal(s) using the symbol trajectory and modulation determined above. Accordingly the ART 350 may regenerate a copy of at least one of the one or more constituent signals (e.g., the signals 122, 124).

In some embodiments, a single constituent signal (e.g., the signal 122) is the signal of interest. For example, the signal 122 may be the signal of interest while the signal 124 is the interfering signal. Therefore, at decision block 452, the processor 204 may determine that the regenerated signal at block 450 is the signal of interest (e.g., the signal 122), and protect the regenerated signal at 454. As used herein, the term protect may generally refer to isolating the desired signal for further interference reduction and/or demodulation.

If at decision block 452, the processor 204 determines that the regenerated signal is an interfering signal (e.g., the signal 124) and not the signal of interest, the processor 204 may proceed to block 455 to cancel the interfering signal from the digitized signal 322. This cancellation may be iterative for the digitized signal 322 having multiple interfering signals. In some embodiments, the method 400 may be iterative to further refine the signals regenerated at block 450.

At block 455, the regenerated signal from block 450 may be canceled from the digitized signal 322 at block 455, after the digitized signal 322 is fed through the delay module 365 at block 460. The cancellation at block 455 may include inverting the copy generated at block 450, correcting the copy for gain and phase and summing the inverted copy with the digitized signal 322.

At block 465, a residual signal results from the combination of the inverted interfering signal and the digitized signal 322. The residual signal may be a version of the digitized signal 322 having at least one constituent signal (e.g., the interfering signal) canceled. In some embodiments this may be referred to as the noise floor. This may further enable the demodulator 300 to characterize the noise floor and increase the SNR of the signal of interest, the signal 122 for example.

Figure 5:
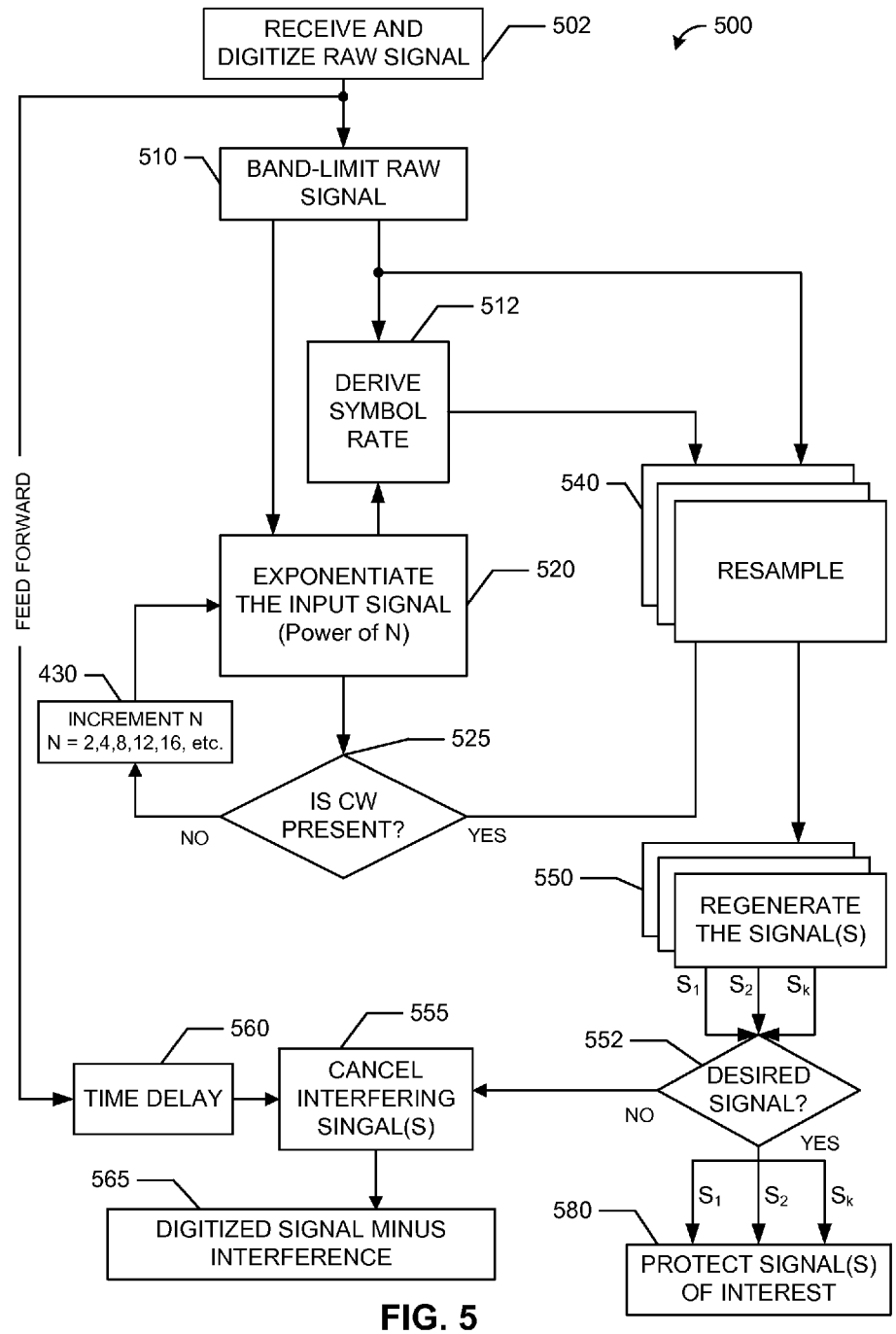
FIG. 5 is a flowchart of a method for multi-signal demodulation.

FIG. 5 is a flowchart of a method for multi-signal demodulation. A method 500 may have certain similar features to the method 400. Accordingly like numbers designate like features and like components.

The method 500 begins at block 502 with the reception of the raw signal 310 at the receiver 212. At block 502 the raw signal 310 may further be digitized by the digitizing module 320 to produce the digitized signal 322. At block 510, the windowing module 325 can band limit the digitized signal 322 such that the windowed signal 328 includes the signal(s) of interest, similar to the method 400.

In some embodiments, the signal(s) of interest may be overlapped in frequency. Accordingly, the windowing module 325 can adjust the windowed signal 328 to a bandwidth that encompasses the signal(s) of interest.

At block 520, the interference detector 330 may exponentiate the windowed signal 328. The exponentiation at block 520 multiplies the windowed signal 328 by itself n times to produce a CW signal, similar to block 420 of the method 400.

At decision block 525 if the current power index, n, does not produce a CW signal then n is incremented at block 530 and the method 500 returns to block 520 with an incremented power index n, similar to the method 400. The power index n can be incremented until a CW waveform is produced for each constituent signal within the windowed signal 328. The power index n provides an indication of the modulation type of the constituent signal. As previously described, the value of n may indicate 2=BPSK; 4=16QAM or QPSK, etc.

In some embodiments, two or more signals with different modulation types may be present. Accordingly, block 420 may yield two or more values of n, depending on the number of constituent signals. In some embodiments, two or more constituent signals may have the same modulation type, thus the same power index n may produce multiple CW waveforms corresponding to the constituent signals.

At block 512, the interference detector 330 may further generate an estimate of the symbol rate for each constituent signal present in the windowed signal 328 based on the windowed signal 328 and power index used to generate the CW waveform(s) in block 520. The interference detector 330 may further have one or more adaptive equalizers configured to refine the symbol rate estimates to derive actual symbol rates for each of the constituent signals within the windowed signal 328, similar to the processes described in connection with FIG. 3.

The method 500 may continue to block 540 where the ART 350 receives the actual symbol rate generated in block 512 and the power index, n, generated in block 520. Similar to above, at block 540 the windowed signal 328 is resampled using the modulation (according to the power index, n) at X-times the symbol rate. The increased resampling rate, for example a multiple of the symbol rate, at block 540 enables the ART 350 to generate a symbol trajectory for each of the constituent signals present within the windowed signal 328. For example, if three values of n corresponded to three CW waveforms at different symbol rates and different types of modulation, the resampling at block 540 may yield certain information about all three constituent signals, indicating a symbol trajectory, shaping factor, bandwidth, frequency offset, phase offset of the various signals, and modulation type. The block 540 may occur in multiple concurrent instances, according to the number of constituent signals. For example, FIG. 5 indicates three resampling blocks 540 corresponding to the multiple signals (e.g., the signal $S_1$, and signal $S_2$ through signal $S_k$, described below).

At block 550, the ART 350 may further regenerate the constituent signals using one or more of the symbol trajectory, shaping factor, phase offset, frequency offset, bandwidth, and other available information. The regenerated signals are labeled as signal $S_1$, signal $S_2$, through signal $S_k$. The signal $S_k$ indicates that more than two signals up to a k-number of signals may be regenerated. In some embodiments the k-number of signals may be processed concurrently and thus simultaneously demodulated.

At block 550, the various regenerated constituent signals can be demodulated (e.g., the signal $S_1$, $S_2$, $S_k$). In some embodiments, the ART 350 can independently derive each of the constituent signals and simultaneously demodulated them even in the presence of a frequency overlap.

At decision block 552, the processor 204 can determine whether one or more of the regenerated signals are the desired signals. Accordingly, the processor 204 may determine that the signal of interest (e.g., the signal 122) was not yet recovered by the method 500. In some embodiments this may occur because the signal of interest (e.g., the signal 122) has a low power level, or a lower power level than the regenerated signals $S_1$:$S_k$. For example, the method 500 may have been able to isolate one or more constituent signals having a higher power level than the signal of interest and determine such signals are interfering signals. If one or more of the regenerated signals is not the signal of interest, at block 555 one or more inverted copies of the one or more of the regenerated interfering signals may be provided to the cancellation module 360. In some embodiments, if none of the regenerated signals at block 550 are the desired signal then they can be treated as interfering signals and canceled.

The cancellation module 360 may also take as an input, a copy of the windowed signal 328 that is delayed by the delay module 365 at block 560. At block 565 a residual signal that has had one or more regenerated signals (not signal(s) of interest) cancelled from it may be produced. Accordingly, the windowed signal 328 minus the canceled interfering signals at block 555 may generate the desired signal (e.g., the signal 122) at block 565.

If at decision block 552 the processor 204 determines that one or more of the regenerated and demodulated signals are desired signals, the method 500 can move to block 580. At block 580, the processor 204 may then protect the one or more desired regenerated signals. In some embodiments, the method 500 may result in any number of regenerated signals. In some embodiments, the undesired signals may be discarded or ignored. In some other embodiments, the undesired signals may be used to refine the desired signal by adaptive cancellation (not shown).

Figure 6A:
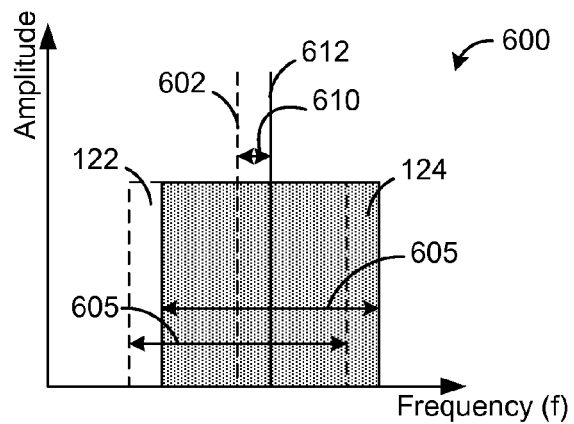
FIG. 6A is plot of two signals overlapped in frequency that may be separated using the methods of FIG. 4 and FIG. 5.
Figure 6B:
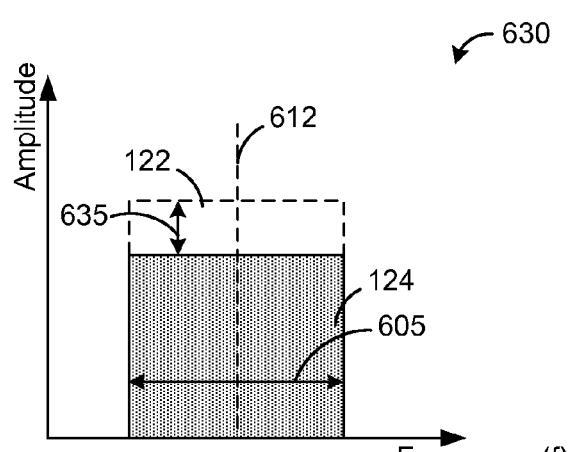
FIG. 6B is another plot of two signals overlapped in frequency that may be separated using the methods of FIG. 4 and FIG. 5.
Figure 6C:
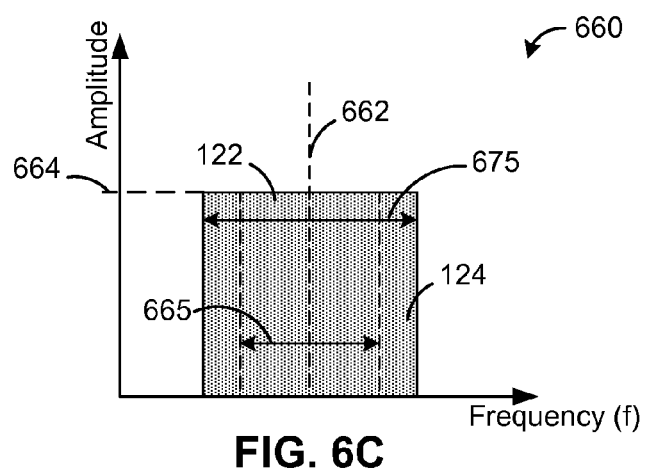
FIG. 6C is another plot of two signals overlapped in frequency that may be separated using the methods of FIG. 4 and FIG.

In some embodiments, the method 500 is iterative. Each iteration of the method 500 may provide successively more accurate regenerations of the constituent signals (e.g., the signals 122, 124). As shown in FIG. 6A-FIG. 6C, the demodulation of multiple overlapping signals can be accomplished with significant or even total overlap in frequency.

Accordingly, by using the interference cancellation method described above, multiple signals may be overlapped in frequency, maximizing the use of available frequency spectra.

FIG. 6A, FIG. 6B, and FIG. 6C that follow are plots of possible ways that signals may be overlapped and transmitted while maintaining sufficient distinguishing qualities such that they may be separated and demodulated as described herein. By overlapping two or more signals (e.g., the signal 122 and the signal 124) in frequency, a communication link (e.g., the communication system 100) may make more efficient use of available frequency spectra and increase data throughput.

As mentioned above, the sum of two or more modulated signals 122, 124 can form a distinct modulation. In some embodiments, the combined signals may be mutually interfering. For a given degree of interference or noise contamination of a communication channel (e.g., in the communication system 100), it is possible to communicate discrete data (digital information) nearly error-free up to a computable maximum rate through the channel. Such a maximum may be computed using Shannon's theorem. As applied to overlapped frequencies as described herein, Shannon's theorem shows that a change in signal to noise ratio of the modulated signals 122, 124 is dependent upon the proposed modulation technique for each of the signals 122, 124 and their underlying required energy per bit to noise power spectral density ratio ($EsN_o$). This value can also be expressed as signal-to-noise ratio (SNR) per bit, or as a normalized SNR measure of the individual signals 122, 124. In some embodiments, such calculations can be useful to derive a maximum overlap and optimum bandwidth or modulation type when transmitting overlapped signals. In some other embodiments, such calculations may further be useful in separation, regeneration, and demodulation techniques for overlapped signals, as described herein.

FIG. 6A is plot of two signals overlapped in frequency that may be separated using the methods of FIG. 4 and FIG. 5. A plot 600 is shown with amplitude on the vertical (y) axis versus frequency (f) on the horizontal (x) axis. The plot 600 shows an embodiment of two signals such as the signal 122 (bounded by dashed lines) and the signal 124 (bounded by solid lines) that can be overlapped in frequency and demodulated by the ART 350. In an embodiment, the signal 122 and the signal 124 can have a same bandwidth 605. The signal 122 can have a center frequency 602 and the signal 124 can have a center frequency 612. A difference between the center frequencies 602, 612 may generally be referred to herein as a phase offset 610.

In an embodiment, the ART 350 may distinguish the signal 122 from the signal 124 during resampling (e.g., the blocks 450, 550) in part due to the increased sample rate used by the separator module 352. While the signal 122 and the signal 124 are only offset slightly by the phase offset 610, the high resampling rate (e.g., X-times the symbol rate) allows the ART 350 to distinguish between multiple signals with only slight variations in center frequency, amplitude or bandwidth.

For example, the phase offset 610 can be a result of the phase shift between the signal 122 and the signal 124. Accordingly, if the signal 122 and the signal 124 are both modulated with QPSK with a 45 degree ($\pi/4$ radians) phase offset 610, the QPSK constellations of each signal 122, 124 will appear with a 45 degree shift in phase; the ART 350 can then distinguish the signal 122 from the signal 124 using the symbol trajectory and shaping factor of the signal 122 and the signal 124 to regenerate and demodulate both of the signals 122, 124. In some embodiments, the system 300 may be capable of separating, regenerating, and demodulating more than two signals at once.

FIG. 6B is another plot of two signals overlapped in frequency that may be separated using the methods of FIG. 4 and FIG. 5. A plot 630 is shown with amplitude on the vertical (y) axis versus frequency (f) on the horizontal (x) axis. The plot 630 further shows the signal 122 (bounded by dashed lines) and the signal 124 (bounded by solid lines) with the same bandwidth 605 as before. The difference between the plot 600 and the plot 630, however, is that in the plot 630, the signals 122, 124 are completely overlapped in frequency, both having a center frequency 632. The plot 630 also shows a difference in amplitude 635. The difference in amplitude 635 indicates that while the signal 122 and the signal 124 are share the same bandwidth 605 and the same center frequency 632, the difference in amplitude 635 (e.g., a power level or received signal strength) can be sufficient to distinguish the signals 122, 124 using the method 400 and the method 500 disclosed herein. Accordingly the ART 350 may separate, regenerate, and demodulate two or more frequencies with the same bandwidth 605 and the same center frequency 632 when there is a difference in amplitude 635.

FIG. 6C is another plot of two signals overlapped in frequency that may be separated using the methods of FIG. 4 and FIG. 5. A plot 660 is shown with amplitude on the vertical (y) axis versus frequency (f) on the horizontal (x) axis. The plot 660 further shows the signal 122 (bounded by dashed lines) and the signal 124 (bounded by solid lines) having a same center frequency 662 and the same amplitude 664. The plot 660 further shows the signal 122 having a bandwidth 665 and the signal 124 having a bandwidth 675. The difference in bandwidth between the signal 122 and the signal 124 can be sufficient to allow the ART 350 to separate, regenerate, and demodulate the signals 122, 124.

Figure 7:
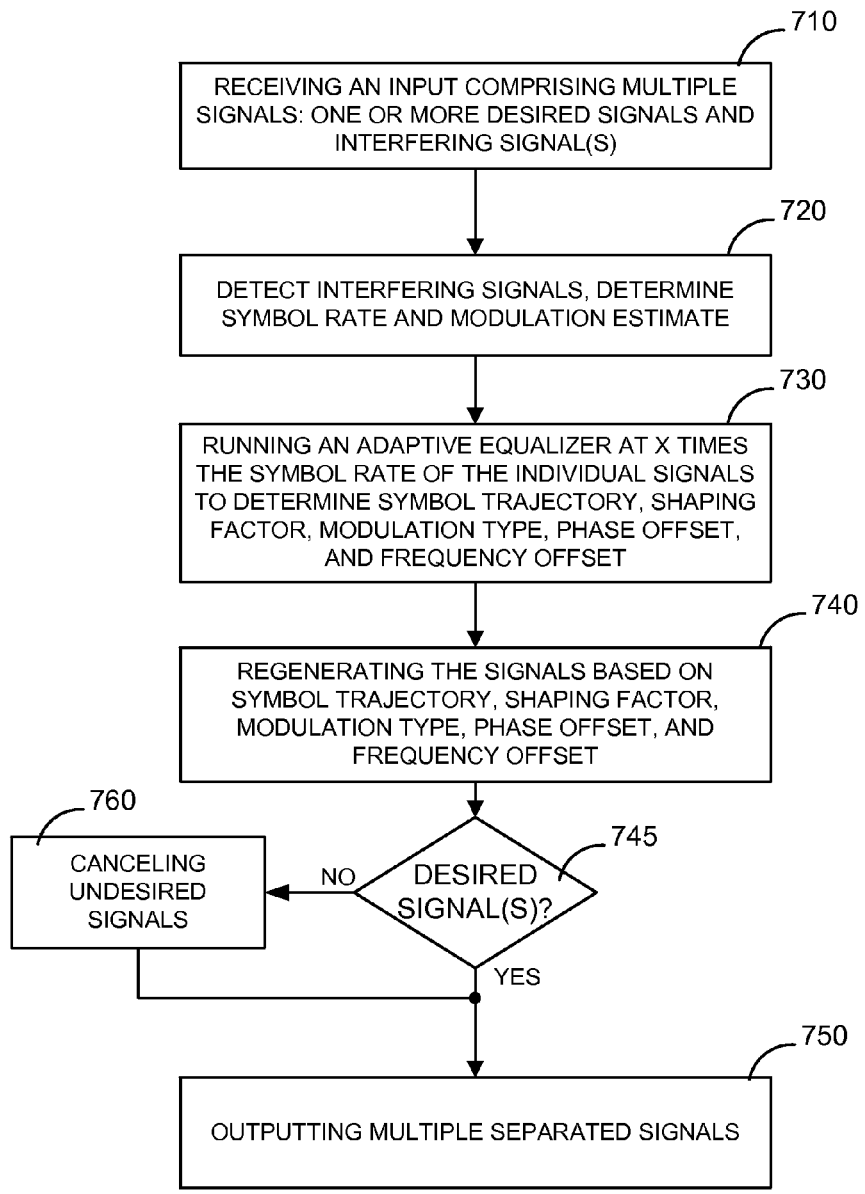
FIG. 7 is a flowchart of a method of separation and demodulation of overlapped signals.

FIG. 7 is a flowchart of a method of separation and demodulation of overlapped signals. A method 700 starts at block 710 when a ground station (e.g., the ground station 106 of FIG. 1) receives an input (e.g., the raw signal 310) having two or more constituent signals. In some embodiments, the two or more constituent signals (e.g., the signal 122 and the signal 124) may be signals of interest. In some other embodiments the input may have one or more interfering signals.

At block 720 the demodulator 300 may detect certain interfering signals within a portion of the input (e.g., the windowed signal 328). The interference detector 330 can derive a symbol rate for the two or more constituent signals 122, 124 within the windowed signal 328. The interference detector 330 can also derive a modulation estimate through exponentiation of the windowed signal 328 (e.g., power of n). The CW waveforms that result from the exponentiation (e.g., the power of n) may be used to determine phase offset, frequency offset, bandwidth, and time delay.

At block 730, one or more adaptive equalizers can be applied to the windowed signal 328 at X times the symbol rate of the individual constituent signals 122, 124 to determine the symbol trajectory, shaping factor, phase offset, frequency offset, and modulation type of the signal 122 and the signal 124.

At block 740, the demodulator 300 and more specifically the ART 350 may regenerate the constituent signals (e.g., the signal 122 and the signal 124) based on one or more of the bandwidth, symbol trajectory, shaping factor, modulation type, phase offset, and frequency offset.

At decision block 745, the processor 204 can determined if the regenerated signals are signals of interest. If the regenerated signals are signals of interest, the method 700 can proceed to block 750.

At block 750, the demodulator 300 can demodulate each of the constituent signals. In some embodiments, the constituent signals can be demodulated simultaneously. In some other embodiments, the adaptive regeneration as disclosed in the method 700 can occur independent of time delay. Due to the adaptive equalization and the resampling at X-times the symbol rate, a more accurate estimation of the constituent signals can be generated at a faster rate than by interference cancellation alone. In some embodiments, the steps indicated in block 710, block 720, and block 730 can be executed in software. In some embodiments, the steps indicated in block 740 and block 750 can be executed in firmware.

If at decision block 745 the signals are not signals of interest, the regenerated signals (e.g., the block 740) can be deemed interfering signals. Accordingly, at block 760, the demodulator 300 (FIG. 3) can cancel the interfering signals from the windowed signal 328. The method 700 can the proceed to block 750 and outputting at least one signal of interest.

In some embodiments, the method 700 can be repeated or iterated as needed to demodulate or separate constituent signals. The method 700 can be combined with the method 400 and the method 500 to effect additional interference cancellation by canceling one or more constituent signals from a time delayed copy of the raw signal to determine a residual signal (e.g., block 565 of FIG. 5) and re-process the residual signal using the method 700.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry, as described in connection with FIG. 2. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

Although embodiment of the invention are described above for particular embodiment, many variations of the invention are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block or distributed across to modules or blocks without departing from the invention.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other embodiment that may become obvious to those skilled in the art and that the scope of the present invention is accordingly limited by nothing other than the appended claims.

What is claimed is:

1. An apparatus for demodulation of multiple received signals, comprising:
    a receiver configured to receive a composite signal, the composite signal having a first signal and a second signal, the first signal overlapping the second signal; and
    at least one processor configured to:
    exponentiate the composite signal n-times until a first power of n yields a first continuous wave corresponding to the first signal, and a second power of n yields a second continuous wave corresponding to the second signal, the first power of n corresponding to a modulation estimate for the first signal, and the second power of n corresponding to a modulation estimate for the second signal, n being an integer greater than zero;

derive at least one symbol rate corresponding to the first signal based on the first power of n and the second power of n;

resample the composite signal based on the modulation estimate at x-times the at least one symbol rate to determine at least one symbol trajectory, at least one modulation type, and offset information between the first signal and the second signal, x being an integer greater than zero;

regenerate the first signal and the second signal based on the at least one modulation type, the at least one symbol trajectory, and offset information; and output the first signal and the second signal.

2. The apparatus of claim 1, wherein the composite signal comprises a third signal and wherein the processor is further configured to demodulate the third signal with the first signal and the second signal.

3. The apparatus of claim 1, wherein the first power of n and the second power of n have different values, the first power of n corresponding to a first modulation type and the second power of n corresponding to a second modulation type.

4. The apparatus of claim 1, wherein the offset information comprises a phase offset and a frequency offset between the first signal and the second signal.

5. The apparatus of claim 2, wherein the phase offset and the frequency offset between the first signal and the second signal each equal zero.

6. The apparatus of claim 2, wherein the first signal and the second signal have a same bandwidth and the phase offset between the first signal and the second signal equals zero.

7. The apparatus of claim 2, wherein the first signal and the second signal have a same amplitude and the frequency offset between the first signal and the second signal equals zero.

8. The apparatus of claim 1 further comprising a windowing unit to correct the bandwidth limited portion based on a center frequency and a bandwidth of a combination of the first signal and the second signal.

9. The apparatus of claim 1, wherein x equals two.

10. The apparatus of claim 1, wherein n is a multiple of two.

11. A method for demodulating multiple received signals, comprising:

receiving a composite signal, the composite signal having a first signal and a second signal the first signal overlapping the second signal;

exponentiating the composite signal n-times until a first power of n yields a first continuous wave corresponding to the first signal, and a second power of n yields a second continuous wave corresponding to the second signal, the first power of n corresponding to a modulation estimate for the first signal, and the second power of n corresponding to a modulation estimate for the second signal, n being an integer graeter than zero;

deriving a symbol rate of the composite signal corresponding to at least one of the first signal and the second signal;

resampling the composite signal based on the modulation estimate at x-times the symbol rate estimate to determine a symbol trajectory, a modulation type and offset information between the first signal and the second signal, x being an integer greater than zero;

regenerating the first signal and the second signal based on the modulation type, the symbol trajectory, the shaping factor, and the offest information; and outputting the first signal and the second signal.

12. The method of claim 11, further comprising receiving the composite signal comprising a third signal; and demodulating the third signal with the first signal and the second signal.

13. The method of claim 11, exponentiating the composite signal until the first power of n yields a continuous wave at a first value of n and the second power of n yield a continuous wave at a second value of n that is different from the first value of n, each of the first value of n and the second value of n corresponding to a different modulation type.

14. The method of claim 11, wherein the offset information comprises at least one of a phase offset, a frequency offset, and a time delay between the first signal and the second signal.

15. The method of claim 11 further comprising correcting the composite signal based on a center frequency and a bandwidth of a combination of the first signal and the second signal.

16. The method of claim 11, wherein x equals two.

17. The method of claim 11, wherein n is a multiple of two.

18. A method for demodulating a composite signal, the composite signal having a first constituent signal overlapping a second constituent signal in frequency, the method comprising:

multiplying the composite signal by itself a first number of times until the first number of times produces at least one continuous waveform, the first number of times indicating at least one modulation estimate;

determining at least one symbol rate of the composite signal, the at least one symbol rate based on the first number of times and the continuous waveform;

resampling the composite signal based on the at least one modulation estimate at a multiple of the at least one symbol rate to determine a symbol trajectory, a modulation type, and offset information between the first constituent signal and the second constituent signal;

regenerating the first constituent signal and the second constituent signal based on the modulation type, the symbol trajectory, the shaping factor, and the offest information; and outputting the first constituent signal and the second constituent signal.

19. The method of claim 18 further comprising:

multiplying the composite signal by itself the first number of times to produce a continuous waveform corresponding to the first constituent signal, the first number of time indicating a first modulation type of the first constituent signal; and multiplying the composite signal by itself a second number of times to produce a continuous waveform corresponding to the second constituent signal, the second number of times indicating a second modulation of the second constituent signal, the second number of times being different from the first number of times.

20. The method of claim 18 further comprising:

determining a first symbol rate estimate based on the continuous wave and the first number of times;

determining a first symbol rate corresponding to the first constituent signal, the first symbol rate based on a first adaptive equalizer sampling the composite signal at a first sampling rate equal to a multiple of the first symbol rate estimate;

determining a second symbol rate estimate based on the continuous wave and the second number of times; and determining a second symbol rate corresponding to the second constituent signal, the second symbol rate based on a second adaptive equalizer sampling the composite signal at a sampling rate equal to a multiple of a second symbol rate estimate.

* * * * *